United States Patent [19]

Zavislake

[11] 4,334,809
[45] Jun. 15, 1982

[54] ARTICLE HOLDER

[76] Inventor: Jim Zavislake, Box 626, Canora, Saskatchewan, Canada

[21] Appl. No.: 175,032

[22] Filed: Aug. 4, 1980

[51] Int. Cl.³ ............................................. B23B 45/00
[52] U.S. Cl. ............................... 408/241 R; 279/1 K; 248/302
[58] Field of Search ................ 229/1 K, 62; 81/40 A; 248/302; 408/240, 241 R

[56] References Cited

U.S. PATENT DOCUMENTS

| | | | |
|---|---|---|---|
| 2,202,798 | 5/1940 | House | 248/302 X |
| 2,592,094 | 4/1952 | Dillenbring | 279/1 K X |
| 2,641,079 | 6/1953 | Oster | 248/302 X |
| 3,749,346 | 7/1973 | Cherniak | 248/302 |

Primary Examiner—Z. R. Bilinsky

[57] ABSTRACT

A wire holder for detachably securing an article such as a key for a power drill chuck, to the flexible cord extending from the corresponding power drill, includes a resilient one-piece length of wire with a partial loop formed intermediate the ends thereof and having a pair of legs extending one from each end of the said loop. Preformed indentations are provided at the inner ends of the legs so that when the legs are crossed over one another, the indentations interlock to hold the loop closed around the shaft of the key or article. The distal ends of the legs are partially turned and engage the flexible power cord whereupon they may be closed by pliers or the like to secure same to the cord.

8 Claims, 7 Drawing Figures

U.S. Patent      Jun. 15, 1982      4,334,809
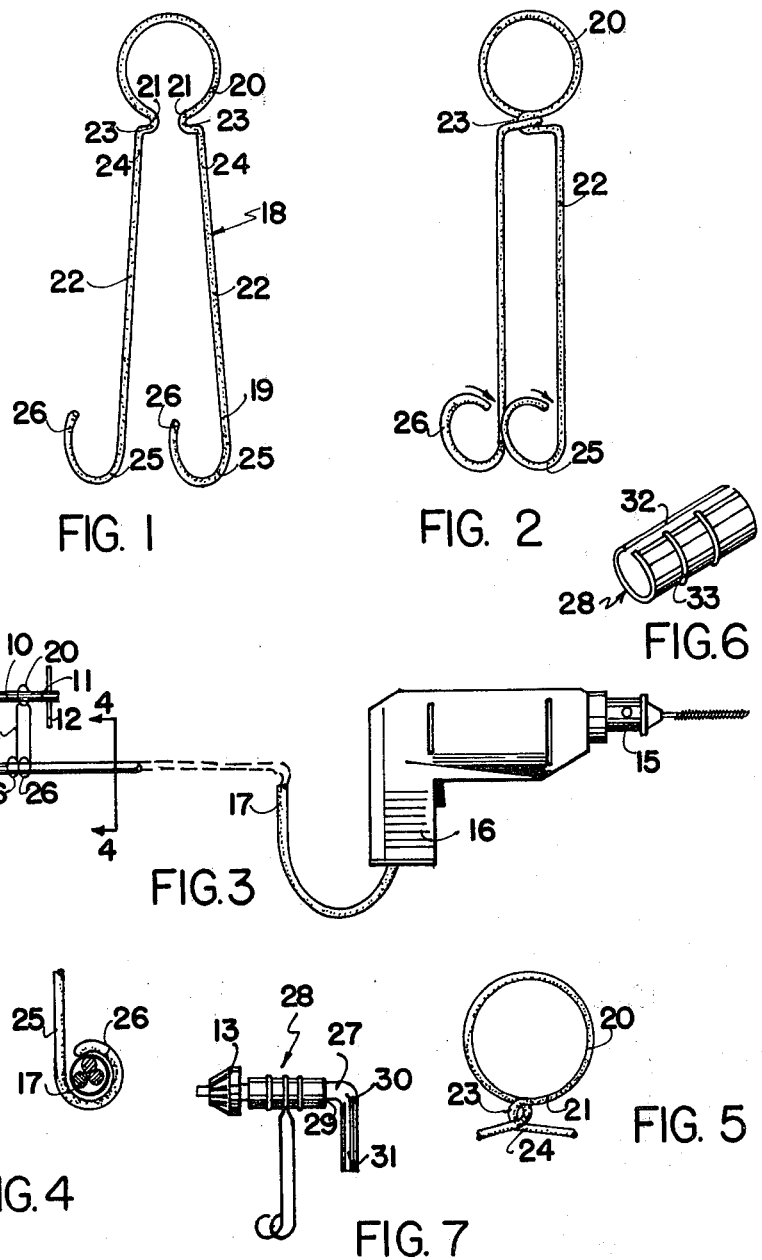

ARTICLE HOLDER

BACKGROUND OF THE INVENTION

This invention relates to new and useful improvements in article holders and although it is directed primarily for use with a drill chuck key in order to hold same upon the flexible cord of the drill, nevertheless it will be appreciated that it can be used to hold other articles in a similar manner.

Conventionally, a rubber lace or string is used to hold a drill chuck key to the flexible cord in order to prevent same from being lost and to ensure that it is ready for use when required.

However such laces or cords often tangle with the tool not only when hanging from the flexible cord but particularly when it is used to release the drill chuck. The cord or lace often becomes broken and the key becomes lost or mislaid.

SUMMARY OF THE INVENTION

The present invention overcomes these disadvantages and in accordance with the invention there is provided a wire holder for detachably securing articles such as drill chuck keys to the flexible power cord of an electric drill or the like; comprising in combination a length of resilient wire, a partial loop formed intermediate the ends thereof having each end extending therefrom to form a leg, preformed inwardly extending notches in the wire adjacent the junction of the legs with the ends of the loop and means on the distal ends of said legs to detachably secure same to a flexible power cord or the like.

Another aspect of the invention is to provide a method of forming a wire holder for detachably securing articles such as drill chuck keys to the flexible power cord of an electric drill or the like; consisting of the steps of forming a partial loop intermediate the ends of a length of resilient wire with a pair of legs extending from the ends of the partial loop, forming indented notches in each leg adjacent the junction of said legs with said loop and then forming partial loops on the distal ends of said legs to engage around a flexible power cord or the like.

Still another advantage of the invention is to provide a holder for an article such as a drill chuck key whereby it may be held conveniently upon the flexible power cord of the drill, a predetermined distance from the drill so that it is readily available and easy to use in order to loosen or tighten the drill chuck.

Another advantage of the invention is to provide a device of the character herewithin described which is easy and convenient to attach to the key and to the cord.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is an isometric view of the key holder in the opened position.

FIG. 2 is a view similar to FIG. 1 but showing the holder in the closed position.

FIG. 3 is a view of the invention attached to a drill chuck key and to the power cord of an electric drill.

FIG. 4 is an enlarged fragmentary cross sectional view along the line 4—4 of FIG. 3.

FIG. 5 is an enlarged fragmentary view of the key holder showing the interlocking of the notched inner ends of the legs.

FIG. 6 is an isometric view of a sleeve required for use with an angulated chuck key.

FIG. 7 is an isometric view of an angulated chuck key with the sleeve engaged thereon and the key holder installed upon the sleeve.

In the drawings like characters of reference indicate corresponding parts in the different figures.

DETAILED DESCRIPTION

Proceeding therefore to describe the invention in detail, with reference to FIG. 3 will show a standard drill chuck key 10 having a shank 11, a cross bar 12 and a chuck engaging bevel gear 13 adjacent the inner end 14 of the shank.

This normally engages the chuck 15 of an electric drill 16 for rotating same so that the chuck will engage or loosen around a drill bit (not illustrated).

A flexible power cord 17 extends from the drill for connecting the drill to a source of electrical energy (not illustrated).

The key holder collectively designated 18 is adapted to detachable secure the key 10 to the power cord at a convenient distance from the drill 16 so that the key is readily available for insertion into the chuck 15 when required.

It is made from a length of resilient spring wire 19 and preformed with a partial loop 20 intermediate the ends thereof with the ends of the wire extending from the ends 21 of the loop, in the form of legs 22 and the natural resiliency of the spring wire is such that these legs are normally urged away from one another to the position indicated in FIG. 1.

Indented notches 23 are preformed adjacent the junction of the ends 21 of the loop and the inner ends 24 of the legs, said notches facing one another as clearly shown in FIG. 1. The distal ends 25 of the legs are partially curved to form partial loops 26, the purpose of which will hereinafter be described.

The resiliency of the wire is such that it if one leg is crossed over the other, the two notches engage with one another as shown in FIGS. 2 and 5 thus closing the loop and moving the legs towards one another with the resiliency of the material causing the two notches to engage with one another thus retaining the legs in the position illustrated in the drawings 2, 3 and 5.

In operation, the wire key holder as illustrated in FIG. 1, is engaged over the cross bar 12 of the key and upon the shank 11 whereupon the two legs are crossed one over the other to interlock the legs via the notches 23 as hereinbefore described.

The flexible power cord 17 is then engaged within the partial loop 26 formed on the distal ends 25 of the legs whereupon a pair of pliers or the like is used to move these partial loops 26 towards the closed position illustrated in FIG. 4, deforming the loops beyond the elastic limit of the material so that they clamp in place around the cord and remain in the clamping position illustrated.

This enables the key 10 to be readily available for use with the chuck 15 and although it can be situated anywhere along the length of the power cord 17, it is preferable that it be approximately 15 inches from the drill with the legs spread out approximately ¾ of an inch one from the other.

Although the device is shown and described for use with a power drill, nevertheless it can be used to secure any article to a flexible cord or the like.

Also it will be appreciated that although it is preferably made from resilient steel wire, nevertheless under certain circumstances, it could be made from a resilient plastic wire and the term "wire" is intended to embrace holders made from both spring steel wire and spring plastic wire.

When the device is designed to be used with an angulated chuck key as illustrated in FIG. 7 and identified by reference character 27, a split cylindrical sleeve collectively designated 28 is required, to be engaged over the inner portion 29 of the key just behind the bevel gear portion 13. This type of chuck key is angulated through 90° as indicated by reference character 30, and terminates in the distal end portion 31 situated substantially at right angles to the inner portion 29.

The sleeve which may be made of metal or plastic, is cylindrical and is provided with a longitudinally extending slit 32 extending from one end to the other so that the resiliency of the sleeve enables it to be opened out and engaged over the inner portion 29 of the key 27 as shown in FIG. 7.

The key holder is then engaged around the sleeve by means of the loop 20 as hereinbefore described and it is prevented from disengaging from the sleeve by the provision of a pair of spaced annular outwardly extending beads 33 formed around the body of the sleeve spaced inwardly from the ends thereof as clearly shown in FIG. 6.

The key holder is then secured to the cord 17 by the loops 25 as hereinbefore described.

Since various modifications can be made in my invention as hereinbefore described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A wire holder for detachably securing articles such as drill chuck keys to the flexible power cord of an electric drill or the like; comprising in combination a length of resilient wire, a partial loop formed intermediate the ends thereof having each end extending therefrom to form a leg, preformed inwardly extending notches in the wire adjacent the junction of the legs with the ends of the loop, means on the distal ends of said legs to detachably secure same to a flexible power cord or the like, a resilient sleeve engaged around the inner end of an angulated drill chuck key, said sleeve being split lengthwise through the wall thereof, said partial loop engaging around said sleeve and means extending from the surface of said sleeve to retain said wire holder thereon, said last mentioned means incuding a pair of spaced and parallel beads formed on the surface of said sleeve.

2. The wire holder according to claim 1 in which said means includes partially formed loops on the distal ends of said legs engageable around the flexible cord and being clampable therearound.

3. The wire holder according to claim 1 in which said legs are crossed over one another whereby said preformed notches engage one with the other thus detachably closing said loop.

4. The wire holder according to claim 2 in which said legs are crossed over one another whereby said preformed notches engage one with the other thus detachably closing said loop.

5. The wire holder according to claim 1 in which the resiliency of the wire normally urges said legs away from one another.

6. The wire holder according to claim 2 in which the resiliency of the wire normally urges said legs away from one another.

7. The wire holder according to claim 3 in which the resiliency of the wire normally urges said legs away from one another, the resiliency of said wire engaging and maintaining one notch with the other.

8. The wire holder according to claim 4 in which the resiliency of the wire normally urges said legs away from one another, the resiliency of said wire engaging and maintaining one notch with the other.

* * * * *